(12) United States Patent  
Westhues et al.

(10) Patent No.: US 9,239,637 B2  
(45) Date of Patent: Jan. 19, 2016

(54) SYSTEMS FOR AN ELECTROSTATIC STYLUS WITHIN A CAPACITIVE TOUCH SENSOR

(75) Inventors: Jonathan Westhues, New York, NY (US); Jefferson Y. Han, Hollis, NY (US)

(73) Assignee: PERCEPTIVE PIXEL, INC., Redmond, WA (US)

( * ) Notice: Subject to any disclaimer, the term of this patent is extended or adjusted under 35 U.S.C. 154(b) by 1035 days.

(21) Appl. No.: 12/871,668

(22) Filed: Aug. 30, 2010

(65) Prior Publication Data

US 2012/0050231 A1    Mar. 1, 2012

(51) Int. Cl.
*G06F 3/041* (2006.01)
*G06F 3/0354* (2013.01)
*G06F 3/044* (2006.01)

(52) U.S. Cl.
CPC ............ *G06F 3/03545* (2013.01); *G06F 3/044* (2013.01); *G06F 3/0416* (2013.01)

(58) Field of Classification Search
USPC .................... 345/179, 173; 178/18.01–20.04
See application file for complete search history.

(56) References Cited

U.S. PATENT DOCUMENTS

| | | |
|---|---|---|
| 4,672,154 A | 6/1987 | Rodgers et al. |
| 4,686,332 A | 8/1987 | Greanias et al. |
| 5,138,118 A | 8/1992 | Russell |
| 5,241,303 A | 8/1993 | Register et al. |
| 5,274,401 A * | 12/1993 | Doggett et al. ............... 347/148 |
| 6,124,848 A | 9/2000 | Ballare et al. |
| 6,243,258 B1 | 6/2001 | Paratore |
| 7,612,767 B1 | 11/2009 | Griffin et al. |
| 2006/0097991 A1 | 5/2006 | Hotelling et al. |
| 2006/0161870 A1 | 7/2006 | Hotelling et al. |

(Continued)

FOREIGN PATENT DOCUMENTS

| | | |
|---|---|---|
| CN | 101133382 A | 2/2008 |
| CN | 101387928 A | 3/2009 |

(Continued)

OTHER PUBLICATIONS

"DuoSense Pen Solutions: a digital comeback for the lost art of handwriting," N-trig, Copyright 2010, Kfar Saba, Israel, 3 pages.

(Continued)

*Primary Examiner* — Lixi C Simpson
*Assistant Examiner* — Ngan Pham Lu
(74) *Attorney, Agent, or Firm* — Brandon Roper; Judy Yee; Micky Minhas

(57) ABSTRACT

Systems are described for transmitting and receiving signals in an active stylus for a capacitive touch sensor, for which the systems have at least one circuit for receiving a current from an electrode and for transmitting a voltage onto the electrode. The systems include components for receiving the current in a receiving mode, a switch, and a switchmode power supply circuit having at least a transformer and a diode, for which the diode is coupled to the transformer. In a transmission mode, there is means for electrically isolating at least some of the components configured for receiving the current in the receiving mode from the voltage formed across the stray capacitance. In the receiving mode, there is a means for electrically isolating at least some of the components configured for receiving the current in the receiving mode from an inductance of the transformer in the switchmode power supply circuit.

21 Claims, 6 Drawing Sheets

(56) References Cited

U.S. PATENT DOCUMENTS

| | | | |
|---|---|---|---|
| 2006/0161871 A1 | 7/2006 | Hotelling et al. | |
| 2008/0128180 A1* | 6/2008 | Perski et al. | 178/18.03 |
| 2010/0252335 A1 | 10/2010 | Orsley | |
| 2010/0315384 A1* | 12/2010 | Hargreaves et al. | 345/179 |
| 2011/0122087 A1 | 5/2011 | Jang et al. | |

FOREIGN PATENT DOCUMENTS

| | | |
|---|---|---|
| CN | 101663638 A | 3/2010 |
| JP | S61292733 A | 12/1986 |
| JP | 2007183809 A | 7/2007 |
| JP | 2007533044 A | 11/2007 |

OTHER PUBLICATIONS

Wacom Pen Displays, Wacom Specialty Industries—Product Overview, downloaded from the internet on Aug. 27, 2010, at http://www.wacom.com/pendisplays/, 2 pages.

DiamondTouch by Circle Twelve, downloaded from the internet on Aug. 27, 2010, at http://circletwelve.com/products/howitworks.html, 2 pages.

Notification of Transmittal of International Search Report and the Written Opinion of the International Searching Authority, or the Declaration dated Jan. 6, 2012 from International Application No. PCT/US2011/043934, 11 pages.

Notification of Transmittal of International Search Report and the Written Opinion of the International Searching Authority, or the Declaration dated Jan. 6, 2012 from International Application No. PCT/US2011/049512 , 12 pages.

State Intellectual Property Office of the People's Republic of China, First Office Action and Search Report Issued in Chinese Patent Application No. 201180041594.5, May 13, 2015, 18 Pages.

Japanese Patent Office, Office Acton Issued in Japanese Patent Application No. 2013-527155, Jul. 1, 2015, 2 Pages.

\* cited by examiner

SYSTEMS FOR AN ELECTROSTATIC STYLUS WITHIN A CAPACITIVE TOUCH SENSOR

TECHNICAL FIELD

This disclosure relates to techniques for capacitive touch sensors that utilize a stylus, for example, in localizing an electrostatic stylus within a capacitive touch sensor.

BACKGROUND

Touch sensors, such as those that are used in touch screens for portable devices and for monitors, can be manipulated using a writing instrument, such as a stylus, thereby enabling entry of information related to a user input. For instance, a stylus may be used to touch various areas of the touch sensor. The user input received by the touch sensor also may involve detecting the movement of the stylus, such as receiving information regarding some form of writing or marking resulting from the movement of the stylus on the touch sensor.

SUMMARY

This specification relates to systems, methods, and techniques for using a capacitive touch sensor with a fine-pointed stylus.

In general, some aspects of the subject matter described in this specification can be embodied in methods that involve a sensor and a stylus. Other embodiments of this aspect include corresponding systems, apparatus, and computer programs, configured to perform the actions of the methods, encoded on computer storage devices.

In general, another aspect of the subject matter described in this specification can be embodied in methods that include the actions related to a capacitive touch sensor and an electrostatic stylus. Some aspects feature a method for using an active stylus to enable determination of a two-dimensional position of the active stylus relative to a capacitive touch sensor, where the capacitive touch sensor has a two-dimensional matrix of conductors configured as a first array of conductors arranged in rows and a second array of conductors arranged in columns, and where the active stylus has an electrode and active components. The method includes receiving a first signal in the active stylus from at least one of the columns in the matrix, measuring a signal strength of each first signal received from the columns, using the measured signal strengths to calculate a first position of the active stylus along a first axis of the matrix of the capacitive touch sensor, and transmitting the calculated first position of the active stylus along the first axis of the matrix of the capacitive touch sensor. The method involves transmitting a second signal from the electrode of the active stylus to at least one of the rows of the matrix to indicate a second position of the active stylus along a second axis of the matrix, where the capacitive touch sensor is configured to determine the second position along the second axis of the matrix based on the received second signal. The electrode is located within the active stylus and is configured to electrostatically couple with the capacitive touch sensor, and the electrode of the active stylus is configured to both receive and transmit signals.

These and other embodiments can each optionally include one or more of the following features. The method can involve, prior to receiving the first signal in the active stylus or transmitting the second signal, receiving a third signal in the active stylus from the capacitive touch sensor to synchronize a time base of the active stylus with a time base of the capacitive touch sensor. The third signal for synchronization can be received in the active stylus through a communication channel. The communication channel can be a wireless communication channel, an ultrasonic channel, or an optical channel. The communication channel can be configured to receive or transmit information related to at least one of the active stylus or the capacitive touch sensor. The third signal can be received from at least one column in the first array of columns, for which the third signal can be received in the active stylus through the electrode at least at the one column. The third signal can be received from a pulse that is simultaneously transmitted on multiple columns in the first array of columns. The third signal can be received once per time frame. The time frame can include a timeslot allocated for the third signal to be received by the stylus. The time frame can include a timeslot allocated for each of the columns to transmit the first signal from the capacitive touch sensor. The time frame can include a timeslot allocated for transmitting the calculated first position from the active stylus. The time frame can include a timeslot allocated for each of multiple active styluses to transmit a respective first position. The transmission of the calculated first position from the active stylus can be configured to occur through a communication channel. The communication channel can be a wireless channel, an ultrasonic channel, or an optical channel. The transmission of the calculated first position from the active stylus can be configured to occur through electrostatic coupling of the electrode of the active stylus to the matrix, and at least one of the rows can be configured to receive the calculated first position from the electrode of the active stylus. The transmissions of the active stylus can be configured to occur simultaneously with multiple transmissions of other active styluses or columns utilizing multiple orthogonal waveforms. The transmissions of the active stylus can be configured to occur with multiple transmissions of other active styluses or columns utilizing simultaneous multiple frequency-divided signals. The transmissions of the active stylus can be configured to occur with multiple transmissions of other active styluses or columns utilizing simultaneous multiple code-divided signals. The method can involve interpolating to compute the first and second positions of the active stylus. The active stylus can include: a switch coupled with the electrode that can be configured for multiplexing a relatively large voltage and a relatively small current, where the switch can be configured for transmitting a voltage onto the electrode in a transmission mode, and for receiving a current from the electrode in a receiving mode; a receiver circuit for the current that can be coupled to the switch to receive at least part of the current through the switch, from the electrode; a transmitter circuit for the voltage that is coupled to the switch to transmit at least part of the voltage through the switch, onto the electrode; a microcontroller coupled to the receiver and the transmitter circuits; and an internal power source to provide power to at least the microcontroller. The microcontroller can be configured to compute coordinate positions of the active stylus with respect to the locations on the capacitive touch sensor, and to report at least some of the coordinate positions from the active stylus. The microcontroller can be further configured to interpolate to compute the coordinate positions of the active stylus. The internal power source can include a battery or a supercapacitor. The current can be on the order of one microamp, and the voltage can be on the order of one hundred volts. The active stylus can have a tip that is configured to interact with the matrix of the capacitive touch sensor. The tip of the stylus can include a force sensor for providing a measurement of force though the stylus.

In general, another aspect of the subject matter described in this specification can be embodied in methods for using a capacitive touch sensor to enable a determination of a two-dimensional position of an active stylus with respect to the capacitive touch sensor, where the capacitive touch sensor has a two-dimensional matrix of conductors configured as a first array of conductors arranged in rows and a second array of conductors arranged in columns, and where the active stylus has an electrode and active components. The method involves transmitting a first signal from at least one of the columns in the matrix to the active stylus for indicating a first position of the active stylus along a first axis of the matrix of the capacitive touch sensor, and receiving a second signal from the electrode of the active stylus at one or more of the rows of the matrix to indicate a second position of the active stylus along a second axis of the matrix. The capacitive touch sensor is configured to determine the second position along the second axis of the matrix based on the received second signal, and the capacitive touch sensor is configured to electrostatically couple with the electrode located within the active stylus.

These and other embodiments can each optionally include one or more of the following features. The method can involve, prior to transmitting the first signal or receiving the second signal, transmitting a third signal to the active stylus from the capacitive touch sensor to synchronize a time base of the active stylus with a time base of the capacitive touch sensor. The third signal can be transmitted from at least one column in the first array of columns to the active stylus through the electrode. The third signal can be transmitted with a pulse that is simultaneously transmitted from multiple columns in the first array of columns. The third signal can be transmitted once per time frame. The time frame can include a timeslot allocated for the third signal to be transmitted to the stylus. The time frame can include a timeslot allocated for each of the columns to transmit the first signal from the capacitive touch sensor. The time frame can include a timeslot allocated for each of multiple active styluses to transmit a second signal used to determine that stylus's position along the second axis. The method can include receiving a calculated first position of the active stylus along the first axis of the matrix of the capacitive touch sensor, where the receiving of the calculated first position from the active stylus is configured to occur through electrostatic coupling of the electrode of the active stylus to the matrix, and for which at least one of the rows is configured to receive the calculated first position from the electrode of the active stylus.

In general, another aspect of the subject matter described in this specification can be embodied in an active stylus configured to operate with a capacitive touch sensor. The active stylus includes an electrode configured to both receive and transmit signals, and configured to electrostatically couple with the capacitive touch sensor. The active stylus includes a switch, coupled with the electrode, which is configured to multiplex a relatively large voltage and a relatively small current, where the switch is configured to transmit a voltage to the electrode in a transmission mode, and to receive a current from the electrode in a receiving mode. The active stylus includes a means for receiving current from the electrode through the switch, and for transmitting voltage that is coupled through the switch to the electrode. The active stylus includes a microcontroller coupled to the receiver and the transmitter circuits and is configured to determine at least one position of the active stylus with respect to locations on the capacitive touch sensor. The active stylus includes an internal power source to provide power to at least the microcontroller.

These and other embodiments can each optionally include one or more of the following features. The microcontroller can be configured to compute coordinate positions of the active stylus with respect to the locations on the capacitive touch sensor, and to report at least some of the coordinate positions from the active stylus. The microcontroller can be configured to interpolate when computing the coordinate positions of the active stylus. The active stylus can include a communication channel that is a wireless channel, an ultrasonic channel, or an optical channel, and the internal power source can be a battery or a supercapacitor. The current can be on the order of one microamp, and the voltage can be on the order of one hundred volts.

In general, another aspect of the subject matter described in this specification can be embodied in an active stylus configured to operate with a capacitive touch sensor. The active stylus includes an electrode configured to both receive and transmit signals, and configured to electrostatically couple with the capacitive touch sensor. The active stylus includes a switch, coupled with the electrode, which is configured to multiplex a relatively large voltage and a relatively small current, for which the switch is configured to transmit a voltage to the electrode in a transmission mode, and to receive a current from the electrode in a receiving mode. The active stylus includes a receiver circuit for receiving current from the electrode through the switch, a transmitter circuit for transmitting voltage that is coupled through the switch to the electrode, a microcontroller coupled to the receiver and the transmitter circuits and configured to determine at least one position of the active stylus with respect to locations on the capacitive touch sensor, and an internal power source to provide power to at least the microcontroller.

In general, another aspect of the subject matter described in this specification can be embodied in a capacitive touch sensor configured to enable determination of a two-dimensional position of an active stylus with respect to the capacitive touch sensor, where the active stylus has an electrode and active components. The capacitive touch sensor includes a two-dimensional matrix of conductors configured to include: a first array of conductors arranged in rows; a second array of conductors arranged in columns; transmitters coupled to the second array of conductors, the transmitters being configured to transmit a first signal from at least one of the columns in the matrix to the active stylus for indicating a first position of the active stylus along a first axis of the matrix of the capacitive touch sensor; and receivers coupled to the first array of conductors, the receivers being configured to receive a second signal from the electrode of the active stylus at one or more of the rows of the matrix to indicate a second position of the active stylus along a second axis of the matrix. The capacitive touch sensor is configured to determine the second position along the second axis of the matrix based on the received second signal. The capacitive touch sensor is configured to electrostatically couple with the electrode located within the active stylus.

In general, another aspect of the subject matter described in this specification can be embodied in a capacitive touch sensor configured to enable determination of a two-dimensional position of an active stylus with respect to the capacitive touch sensor, where the active stylus has an electrode and active components. The capacitive touch sensor has a two-dimensional matrix of conductors configured to include: a first array of conductors arranged in rows; a second array of conductors arranged in columns; and means for transmitting a first signal from at least one of the columns in the matrix to the active stylus for indicating a first position of the active stylus along a first axis of the matrix of the capacitive touch sensor, and receiving a second signal from the electrode of the active stylus at one or more of the rows of the matrix to indicate a second position of the active stylus along a second axis of the matrix. The capacitive touch sensor is configured to determine the second position along the second axis of the matrix based on the received second signal. The capacitive touch sensor is configured to electrostatically couple with the electrode located within the active stylus.

In general, another aspect of the subject matter described in this specification can be embodied in a method for transmitting and receiving signals in an active stylus for a capacitive touch sensor, where the active stylus includes an electrode and at least one circuit for receiving a current through the electrode and for transmitting a voltage onto the electrode. The method involves, in a transmission mode, configuring the circuit for transmitting a voltage through a node coupled to the electrode by: generating a voltage using a switchmode power supply circuit, where the switchmode power supply circuit includes at least an inductor and a diode, and where the diode is coupled to the transformer; permitting the diode to be intermittently forward-biased in the transmitting mode, and for current to flow through the diode into a stray capacitance; and configuring a switch in the transmit mode to electrically isolate at least some components in the circuit configured for receiving the current in a receiving mode from the voltage formed across the stray capacitance. The method involves, in the receiving mode, configuring the circuit for receiving the current through the node coupled to the electrode by: configuring the switch to receive the current into the components in the circuit configured for receiving the current in the receiving mode, and configuring the diode to be reversed-biased in the receiving mode such that at least some of the components in the circuit configured for receiving the current in the receiving mode are electrically isolated from an inductance of the transformer in the switchmode power supply circuit.

These and other embodiments can each optionally include one or more of the following features. A resistor can be coupled to the diode. The method can include providing a reference voltage on at least one terminal of the resistor that is greater than a ground voltage of the circuit. The method can include, in the receive mode, sending at least part of the received current into a current receiver circuit, where the current receiver circuit is controlled by a microcontroller. The switch can be configured in the transmit mode to electrically isolate at least some components in the circuit configured for receiving the current in the receiving mode from the voltage formed across a parasitic capacitance associated with one or more components on the node coupled to the electrode. The method can include placing a second deliberate capacitance in parallel with the stray capacitance at the node coupled to the electrode. The method can include receiving the current on an order of one microamp, and transmitting the voltage on the order of one hundred volts. The switchmode power supply circuit can include a flyback circuit.

In general, another aspect of the subject matter described in this specification can be embodied in an apparatus for transmitting and receiving signals in an active stylus for a capacitive touch sensor. The apparatus has at least one circuit for receiving a current from an electrode and for transmitting a voltage onto the electrode. The apparatus includes the electrode, components configured for receiving the current in a receiving mode, a switch, and a switchmode power supply circuit including at least a transformer and a diode, where the diode is coupled to the transformer. In a transmission mode, the circuit for transmitting the voltage to the electrode is configured to: generate the voltage using the switchmode power supply circuit, configure the diode to be intermittently forward-biased in the transmitting mode, and for current to flow through the diode into a stray capacitance, and configure the switch in the transmit mode to electrically isolate at least some of the components configured for receiving the current in the receiving mode from the voltage formed across the stray capacitance. In the receiving mode, the circuit for receiving the current from the electrode is configured to: configure the switch to receive the current into the components configured for receiving the current in the receiving mode, and configure the diode to be reversed-biased in the receiving mode such that at least some of the components configured for receiving the current in the receiving mode are electrically isolated from an inductance of the transformer in the switchmode power supply circuit.

These and other embodiments can each optionally include one or more of the following features. The switchmode power supply circuit can include a flyback circuit. The apparatus can include a resistor, where the resistor is coupled to the diode. The circuit can be configured to provide a reference voltage on at least one terminal of the resistor that is greater than a ground voltage of the circuit. The circuit can be configured to send, in the receive mode, at least part of the received current into a current receiver circuit, where the current receiver circuit can be controlled with a microcontroller. The stray capacitance can include a parasitic capacitance associated with one or more components on the node coupled to the electrode. The apparatus can include a second deliberate capacitance that is located in parallel with the stray capacitance at the node coupled to the electrode. The received current can be on the order of one microamp, and wherein the transmitted voltage can be on the order of one hundred volts.

In general, another aspect of the subject matter described in this specification can be embodied in a system for transmitting and receiving signals in an active stylus for a capacitive touch sensor, for which the system has at least one circuit for receiving a current from an electrode and for transmitting a voltage onto the electrode. The system includes the electrode, components configured for receiving the current in a receiving mode, a switch, and a switchmode power supply circuit having at least a transformer and a diode, for which the diode is coupled to the transformer. In a transmission mode, the circuit for transmitting the voltage to the electrode is configured to: generate the voltage using the switchmode power supply circuit; configure the diode to be intermittently forward-biased in the transmitting mode, and for current to flow through the diode into a stray capacitance; and means for electrically isolating at least some of the components configured for receiving the current in the receiving mode from the voltage formed across the stray capacitance. In the receiving mode, the circuit for receiving the current from the electrode is configured to configure the switch to receive the current into the components configured for receiving the current in the receiving mode, and means for electrically isolating at least some of the components configured for receiving the current in the receiving mode from an inductance of the transformer in the switchmode power supply circuit.

These and other embodiments can each optionally include one or more of the following features. The switchmode power supply circuit can include a flyback circuit. The system can include a resistor, where the resistor can be coupled to the diode. The circuit can include a means for providing a reference voltage on at least one terminal of the resistor that is greater than a ground voltage of the circuit. The circuit can have a means for sending, in the receive mode, at least part of the received current into a current receiver circuit, where the current receiver circuit is controlled with a microcontroller. The stray capacitance can include a parasitic capacitance associated with one or more components on the node coupled to the electrode. The system can include a second deliberate capacitance that is located in parallel with the stray capacitance at the node coupled to the electrode. The received current can be on the order of one microamp, and the transmitted voltage can be on the order of one hundred volts.

In general, another aspect of the subject matter described in this specification can be embodied in a circuit for transmitting and receiving signals with an electrode in an active stylus. The circuit includes first, second and third resistors, first and second transistors, a transformer, a first diode, an amplifier, and a capacitor. The first resistor is coupled with an input terminal and the first transistor. The first transistor includes a first terminal coupled to the resistor, a second terminal coupled to a ground node, a third terminal coupled to a first winding of the transformer. The transformer has the first winding coupled between a terminal for a power supply and the third terminal of the first transistor, and a second winding coupled between the ground node and an anode of the first diode. The first diode has a cathode coupled to a node that is coupled to an electrode configured to receive and transmit signals with a capacitive touch sensor. The second resistor is coupled between the node that is coupled to the electrode and a reference voltage. The second transistor includes a first terminal coupled to the node coupled to the electrode, a second terminal coupled to a terminal for a switched signal, and a third terminal coupled to an inverting input of the amplifier. The amplifier has a non-inverting input that is coupled to the reference voltage. The third resistor is coupled between the inverting input of the amplifier and an output of the amplifier. The capacitor is coupled between the inverting input of the amplifier and the output of the amplifier. The reference voltage is configured to be greater than a voltage of the ground node and less than the power supply voltage. The circuit is configured to have a receiving mode for receiving a current through the node coupled to the electrode, and a transmitting mode for transmitting a voltage through the node coupled to the electrode. In a receiving mode, the first diode is configured to be reversed-biased and the second transistor is configured to electrically connect the first and third terminals of the second transistor. In a transmitting mode, the first diode is configured to be intermittently forward-biased and the second transistor is configured to form an open circuit to electrically disconnect the first and third terminals of the second transistor.

These and other embodiments can each optionally include one or more of the following features. The received current can be on the order of one microamp, and the transmitted voltage can be on the order of one hundred volts. The circuit can include a second diode, for which the second diode can be coupled in parallel with the second and third terminals of the first transistor.

The details of one or more embodiments of the subject matter described in this specification are set forth in the accompanying drawings and the description below. Other features and aspects of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
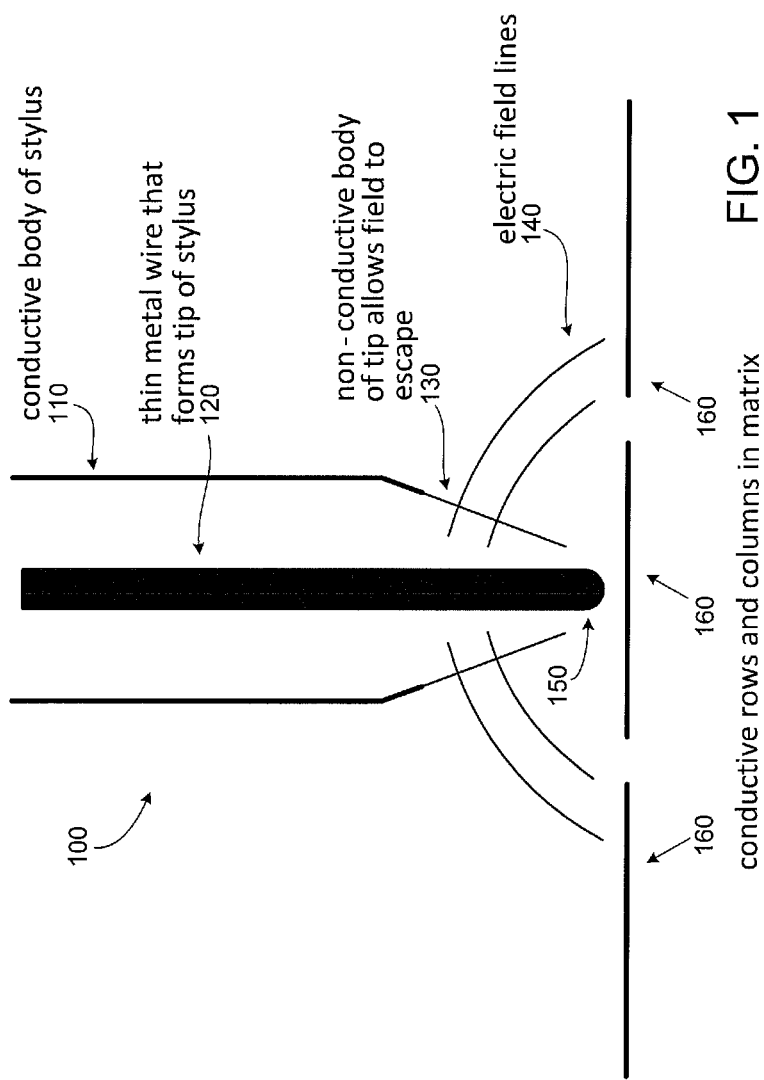
FIG. 1 depicts a diagram of an implementation of an active stylus.

There are methods to detect the position of a human finger, along a two-dimensional sensor array and according to its effect on an electric field. These methods involve a matrix of conducting rows and columns, approximately at right angles to each other. For example, a sensor can measure the capacitance from each row to each column, making m*n measurements for a matrix with m rows and n columns. That measurement can be made by applying an excitation voltage on a given column, and measuring the resulting current (through that capacitance) on a given row. It can be arbitrary as to which axis is designated as the rows vs. columns.

This measurement can detect the position of a human finger, since the human finger, being somewhat conductive and connected with some relatively small impedance to the controller circuit's ground node, affects the capacitance at the matrix intersection where it touches. The capacitance may increase, due to the high (and complex, since it is conductive and therefore lossy) dielectric constant of the human finger, or decrease, due to the finger's connection to ground, according to the specific design of the sensor.

In any such sensor, the m*n measurements (or some chosen subset of them) can be made periodically at some frame rate, for example 100 Hz. This frame rate can be a tradeoff of noise against response time. A slow frame rate may allow for long integration times while measuring, which tends to reduce noise, but the delay may be objectionable to the user. A fast frame rate can provide a fast response, but little time to measure, and may therefore provide a noisy measurement. The overall frame time can be divided into slots, with one column (or multiple columns, e.g., two columns if the display is split into halves or quadrants) excited during each slot. If a receiver is provided for each row, for example, then all the rows may be measured simultaneously. If not, then a smaller number of receivers may be multiplexed among the rows, with the frame broken down into yet more timeslots.

In some applications, it can be desirable to track not a human finger, but some stylus that may be held in the hand. A finger can be relatively large compared to a stylus, and a fine-pointed stylus may provide better pointing accuracy. A stylus may also be built with buttons or other sensors (scroll wheels, etc.) on its surface, to provide the user with additional degrees of freedom for input. With some types of touch screens, any object may be used as a stylus. (For example, a resistive touch screen may respond to force, and may be used with any rigid object.) But a capacitive touch screen may not respond to a touch with a non-conducting stylus, since such a stylus does not significantly disrupt the electric field. To clarify, there may be some effect observed due to the stylus's dielectric constant, which can be higher than that of air and thus increase the measured capacitance, but this effect is relatively small, resulting in non-significant disruption in the electric field.

A capacitive touch screen can respond to a touch with an electrically conductive stylus, if that stylus is held in the grounded user's hand. Such a stylus can be configured to have an electrically conductive tip (generally compliant), and a conductive path from the tip to the user's body. As such, the stylus may perform almost like the user's finger. But since a human finger produces a spot somewhat larger than ~5 mm when pressed against the sensor, the rows and columns can be placed with spacing on that order. This may be the minimum spacing required to interpolate correctly, and to provide a measurement of position with higher resolution than the sensor pitch. A conductive stylus therefore may also have a tip on the order of that 5 mm in diameter, in order (a) to provide a sufficiently large change in capacitance to achieve an acceptable signal-to-noise ratio, and (b) to provide a signal that spans at least two matrix intersections, which is desirable to allow the sensor to interpolate for finer resolution. Thus, a stylus with a tip finer than that ~5 mm may be desired because the fine-pointed stylus occludes less of the displayed image, and provides higher accuracy than a stylus that does not have a fine-pointed tip. The fine-pointed stylus can allow a user to point more accurately and precisely than a typically-sized human finger or a stylus with a relatively fat tip, of around that ~5 mm, for example. A person's finger or a fat-tip stylus may not point as accurately as a relatively fine or short-tip stylus, and the tip of the finger or fat-tip stylus may contribute to relatively significant occlusion when pointing to the matrix.

For a capacitive touch screen, the signal that is provided (e.g., from the disruption of the fringing electric field from the stylus) can be proportional to contact area of the sensor. A skinny or thin stylus in close proximity to the sensor can have a small effect, and that effect may not be easily measured against noise. In some implementations, a skinny or thin stylus may also not be easily interpolated because a capacitive touch screen has a pitch, for example, of around 5 mm (e.g., because the contact area of a person's finger against the touch screen is usually at least 5 mm). In other implementations, interpolation can be performed as long as the pitch of the sensor is smaller than the contact area of the actuating object. For example, even if the rows and columns are placed on 5 mm centers, the position can be reported with resolution better than that 5 mm by using interpolation. For example, the finger or fat-tipped stylus may be on ½ of row 1 and ½ on row 2, which can be interpolated as 1.5. This example can work if the contact area is large enough to span at least two rows (or columns).

To improve the signal-to-noise ratio compared to that of a fine-pointed passive stylus, an active stylus is contemplated. This stylus, rather than just being connected to ground through the user's hand, contains active electronics, and is capable of receiving or transmitting a signal on its tip. In this sense, the stylus may be configured as illustrated in FIG. 1.

FIG. 1 shows an implementation of an active stylus 100, which is in close proximity to conductive rows and columns in a matrix 160, and which has a conductive body 110, and a thin metal wire forming its tip 120. The stylus 100 has a non-conductive body of the tip 130 that allows the electric field lines 140 from the matrix 160 to escape the stylus 100.

In some implementations, the capacitance between the tip of the stylus and a row or column in the matrix can be almost entirely a fringing capacitance, and can be relatively small compared, for example, to the capacitance between a row and a column in the matrix. For example, for a sensor having diamond-shaped conductor patterns on the rows and columns on ~5 mm pitch, and for a thin electrode in the stylus ~20 mm long, the resulting capacitance can be on the order of 100 fF to the row or column directly under the stylus. A diamond-shaped conductor pattern is shown and described in U.S. patent application Ser. No. 12/857,024, filed on Jul. 16, 2010, the disclosure of which is incorporated by reference. The stylus is then grounded through the user's hand. With a metal-bodied stylus, the coupling capacitance from the stylus to the user's hand is relatively large (e.g., in the hundreds of pF) so that the user's capacitance to ground, which is typically smaller, but at least 10 pF, dominates the impedance from the stylus's circuit ground to the circuit ground for the sensor's control electronics. Since this capacitance is large compared to the 100 fF capacitance from the tip of the stylus to the sensor, the stylus's and controller's circuit grounds stay at roughly the same potential. Because the coupling is capacitive, the DC component of the voltage from the stylus's circuit ground to the controller circuit's ground is irrelevant. The AC component of this voltage can appear as noise. As the capacitance between the stylus's circuit ground and the controller circuit's ground increases, the magnitude of this noise voltage, for a given noise current, decreases. In an implementation, that capacitance may be large enough to keep the noise voltage within an acceptable range for proper operation of the stylus.

To measure the position of the stylus in one axis, the stylus may receive the signal transmitted along the columns. To do this, the timebase of the stylus is first synchronized with that of the control electronics for the sensor. This may be achieved by transmitting a distinctive synchronization signal (e.g., at a different frequency, or modulated with a distinctive pattern) on all of the columns of the matrix simultaneously. This provides a time reference to the stylus. The stylus may maintain its time reference thereafter, using a crystal or other frequency standard within the stylus. The synchronization pulse may generally be transmitted once per frame; but in some cases, it may be transmitted more or less often, according to the latency required of the system, and to the long-term accuracy of the stylus's frequency standard. The stylus can search for this synchronization pulse, and when the stylus receives the synchronization pulse, reset its own timebase. Thereafter, the control electronics scan the sensor in the usual way, by exciting each column in sequence with the usual voltage waveform. By measuring the current received on each row, the controller measures the capacitance from each row to each column, and thereby measures finger touch in the usual way. Simultaneously, the stylus measures the received signal strength during each column's slot. If the stylus receives signal during a given slot, then the stylus determines that it is positioned close to that column. For the geometry as indicated in FIG. 1, the stylus can receive a measurable signal on about five columns, and may interpolate to determine its position along the x axis (assuming, arbitrarily, that the x axis runs perpendicular to the columns) with higher resolution.

For example, the stylus may initially reset its timebase when it receives a synchronization pulse, at a time arbitrarily designated as t=0. Thereafter, the stylus may know that the controller will excite columns 1 through n, at times t=1, 2, . . . , n. If the stylus receives energy in slot 7, then the stylus is determined to be close to column 7. This may provide coarse (e.g., on the order of the sensor pitch of around 5 mm) position and interpolation may be used to provide fine position.

Then, to determine the stylus's position in the other axis, an additional timeslot is added to the frame, in which none of the columns transmit. Instead, the stylus transmits the same signal as would have been used to excite a column. By looking at the outputs of the receivers attached to each row, the position of the stylus in the y axis can be determined. One or more receivers in the touch screen can receive this signal transmitted by the stylus; if energy is received by a particular receiver, then the controller may determine that the stylus is close to that particular row. This process can be analogous to the process by which the position was determined in the x axis, but with the transmitter and receiver interchanged. (Along the x axis, multiple columns transmitted in multiple timeslots, and the stylus received. Along the y axis, the stylus transmitted in a single timeslot, and multiple rows received.) As for the case of finger touch, the rows receive the signal and the columns transmit the signal, but the stylus both receives and transmits signals. The stylus transmits to localize itself among the rows and receives to localize itself among the columns. From these localizations, interpolation can be used to determine a more exact location in the touch sensor.

If multiple styluses are present, then they can determine their position along the x axis in parallel, but each stylus requires a separate timeslot to determine its position along the y axis. The division of the overall frame time into timeslots therefore appears as in FIGS. 2A and 2B.

Figure 2A:
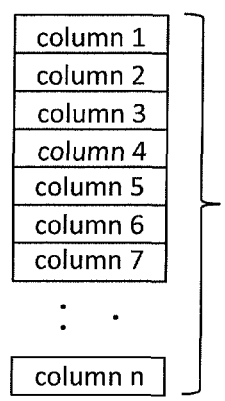
FIG. 2A depicts a diagram showing a division of a frame into timeslots with finger touch only.
Figure 2B:
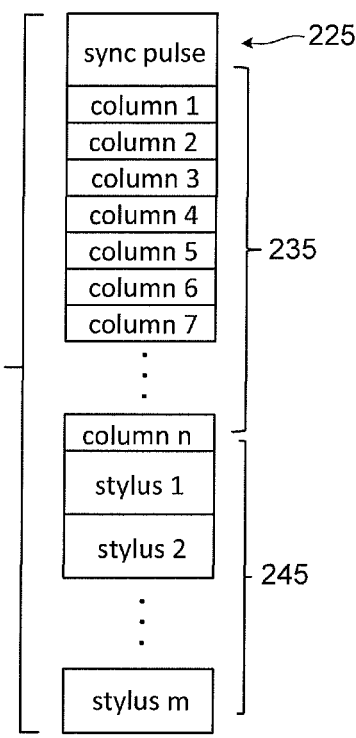
FIG. 2B depicts a diagram showing a division of a frame into timeslots with finger touch and the stylus.

FIG. 2B shows the case where multiple styluses are localized simultaneously, in a single frame, and each stylus is assigned a single timeslot to determine its position along the rows. FIG. 2A shows a frame 210 with n timeslots for n columns, for the case where the scan seeks to detect only finger touch. For the scan with both finger touch and stylus, FIG. 2B shows a frame 220 where a timeslot 225 is added for the synchronization pulse, the n timeslots 235 for n columns are retained, and m timeslots are added form styluses, where n and m are integers greater than or equal to one, with m corresponding to the number of styluses.

By this process, the y coordinate can be calculated within the control electronics on the host (e.g., a device with processing capabilities), where it may be passed back to the application software over the same path as finger touch information (e.g., over a universal serial bus (USB) link back to a computer). In other words, the row position can be calculated on the basis of signals received by the row receivers. So the row position can be calculated by the same part of the system that calculates finger touches, for example. Those row positions can be reported back to the system, for example, by a USB or other link.

But the x coordinate is calculated within the stylus, and can be relayed back to the application software in a number of ways. In other words, the column positions can be calculated as a function of signals received by the stylus, and the column positions can be reported to the system (e.g., using a wireless or wired connection from the computer to the host). In one example, if the stylus is wired to the system, for example, then the communication link can be established with this wiring, and the wiring can also provide a common ground between the sensor and the stylus. In another example, the stylus can transmit information to the system wirelessly. For instance, this information may be transmitted electrostatically through the matrix itself, by adding multiple timeslots and transmitting the binary-coded x coordinate with one bit per timeslot. This requires no additional hardware, but instead can be accomplished by modifying the stylus's control software to differently utilize the existing hardware. Specifically, this may be accomplished using the hardware that was otherwise used to generate the signal used to localize the stylus in the y axis. For example, the stylus can transmit coordinate information from the stylus to the host through the matrix, where the transmitters and receivers that are used for localizing the stylus can also be used to transmit information using any wireless coding schemes that are used to transmit information over a wireless channel. So a timeslot can be added for each bit of the coordinate, for example, and during that timeslot, the stylus can transmit if the corresponding bit is a "1", or not transmit if the corresponding bit is a "0". This scheme corresponds to amplitude shift keying (ASK), but other coding schemes may be used. By adding the timeslots to the system, the information can be coupled from the stylus back to the host through the matrix using the existing hardware. An error-detecting or -correcting code may be used to improve the robustness of the system to random bit errors due to noise.

The x coordinate may also be transmitted over the auxiliary channel, for example a radio-frequency communications channel, like an IEEE 802.15.4 link. The bit rate can be relatively low, since only one coordinate per stylus needs to be transmitted per frame, so that with a 16-bit position and 100 frames per second, for example, the total bit rate is 1600 bits/s. By using the auxiliary channel, no additional time within the frame may be required to transmit the position through the matrix. This can allow the system to reserve more time to make the finger touch capacitance measurements (and stylus position measurements), resulting in better signal-to-noise ratio (SNR). If the auxiliary channel is used to transmit the x coordinate, then that auxiliary channel may also be used to synchronize the time base of the control electronics with that of the stylus, removing the need for an additional timeslot for the synchronization pulse. This may further increase the available time within the frame, thus improving the SNR. Other types of communication channels may be used, including other radio frequency (RF) links, ultrasonic links, and optical links, for example.

The auxiliary channel may also improve performance, to the extent that it eliminates the need for a synchronization pulse transmitted through the matrix. The synchronization pulse is configured to appear on all columns (or, at least, many columns uniformly spaced throughout the matrix, for example, one in every three columns) in order to be received by the stylus irrespective of the stylus's location. Consequently, the total instantaneous transmitted energy is greater than when a single column is excited, and is more likely to cause electromagnetic compatibility (EMC) problems. If the synchronization pulse is instead transmitted over an auxiliary channel, then this effect is avoided, because the synchronization pulse through the matrix becomes unnecessary.

The same path used to communicate the x coordinate may also be used to communicate other information, for example, the state of switches or other controls attached to the stylus. The value of a force sensor in the tip of the stylus, for example, can be reported, to discriminate stylus touch from stylus hover and to provide a continuous measurement of the stylus force. In this regard, a single force sensor in the stylus can be used, perhaps supplanting the need for multiple force sensors throughout the matrix, or perhaps providing a higher-quality measurement of the force through the stylus, while multiple force sensors throughout the matrix are simultaneously used to measure the force of finger or other non-stylus touches.

Figure 3:
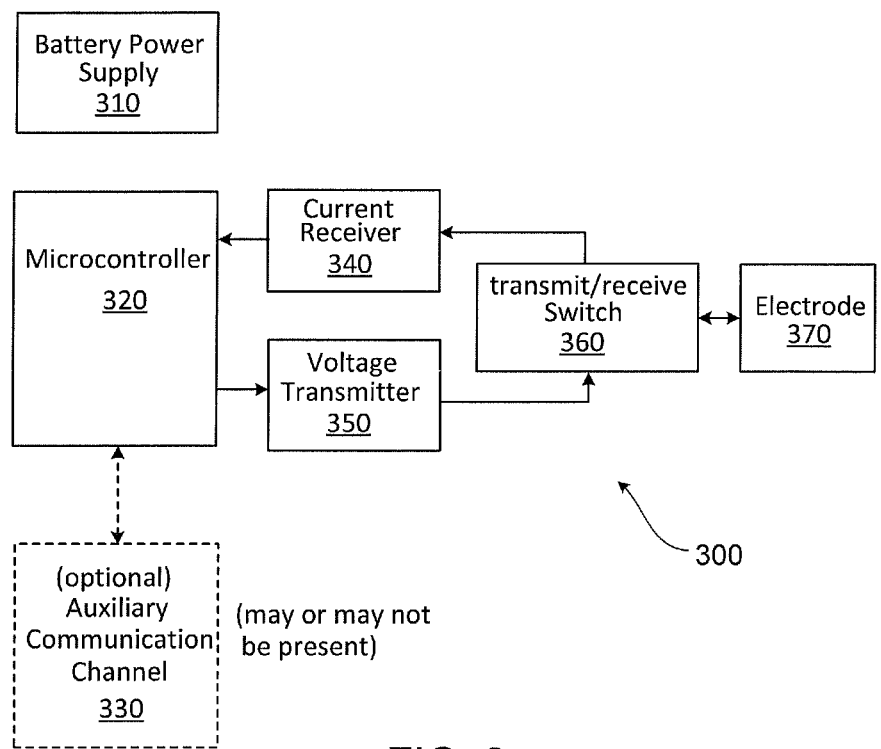
FIG. 3 depicts a block diagram of an active stylus.

FIG. 3 shows a block diagram of some of the components of the stylus 300. The stylus 300 includes a current receiver 340, a voltage transmitter 350, and a microcontroller 320 to sequence operations between the current receiver 340 and the voltage transmitter 350. The stylus 300 also includes an electrode 370 coupled to a transmit/receive switch 360. The transmit/receive switch 360 is coupled to the current receiver 340 and the voltage transmitter 350. To operate these active electronics, some power source is required, for example a battery power supply 310 or a supercapacitor. If the screen size is sufficiently small to make this practical, then the stylus could also be powered inductively, e.g., from a coil behind or around the screen. The stylus 300 may also optionally include an auxiliary communication channel 330 for reasons described above.

In operation, the microcontroller 320 sequences the process, where the software in the microcontroller 320 is responsible at least for maintaining the sense of time, for computing the coordinates, computing the interpolation, and reporting the coordinates back to the matrix, and so on. The microcontroller 320 runs off of some internal power source (e.g., a battery power supply 310, a supercapacitor, a rechargeable battery) in the stylus. The microcontroller 320 is coupled to a current receiver 340 (that may be similar to the receiver on the rows used when measuring capacitive finger touch), and a voltage transmitter 350 (that may be similar to the transmitter on the columns used when measuring capacitive finger touch). A transmit/receive switch 360 can be configured to allow the system to multiplex the current in the current receiver 340 and the voltage in the voltage transmitter 350 onto the one electrode 370 in the stylus 300. The transmit/receive switch 360 can allow a high voltage (e.g., around 100 V) output to be applied to the electrode 370 in the transmit mode, and to receive a small current signal (e.g., around 1 uA) from the electrode 370 in the receive mode.

The voltage transmitter 350 and the current receiver 340 can be configured to have a similar form to the transmitters and receivers attached to the columns and rows in the matrix, and make a similar measurement. Most classes of circuits that are suitable for exciting the column voltage and measuring the row current to determine finger touch on a capacitive sensor may also be suitable here. Non-coherent detection may be employed here, since it may not require as precise alignment of the stylus's timebase as would phase-coherent detection.

The above description may assume that only one entity (whether that entity is a column in the matrix, or a stylus) transmits at a time. This may represent an example of a simple implementation, but in some cases, it may be desirable for multiple entities to transmit orthogonal waveforms simultaneously. All of the techniques described above still work in this case (e.g., with multiple orthogonal frequencies, or with orthogonal pseudo-noise waveforms of the type used in CDMA communications). In this case, it may be possible to transmit a greater total energy per frame, improving signal-to-noise. In such an implementation, a more complex receiver may be used, to correlate for the multiple orthogonal waveforms simultaneously. Some techniques for transmitting orthogonal waveforms simultaneously are described in U.S. patent application Ser. No. 12/838,419, filed on Jul. 16, 2010, the disclosure of which is incorporated by reference.

As described above, because the stylus must both transmit and receive from a single electrode, that electrode can see both large voltages and small currents. When transmitting, to achieve acceptable signal-to-noise in the matrix's receivers, a peak-to-peak voltage swing around 100 V can be generated. When receiving, signals around a microamp can be resolved. Some type of transmit/receive switch or circuit is necessary to provide this dynamic range. A circuit that achieves this is shown in FIG. 4.

Figure 4:
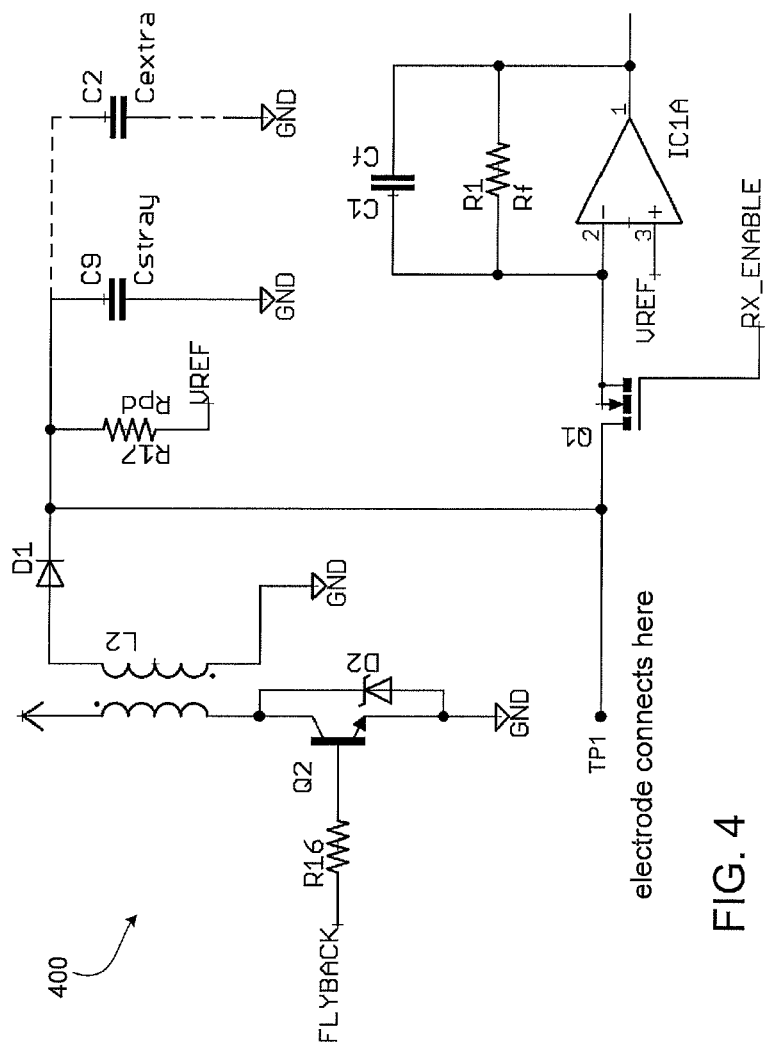
FIG. 4 depicts a diagram of a circuit to transmit and receive signals on a single electrode.

FIG. 4 shows an implementation of a circuit 400 in an active stylus for transmitting a large voltage and receiving a small current on a single electrode. The circuit 400 includes a resistor R16 coupled to an input terminal ("flyback") and a transistor Q2. The transistor Q2 has a first terminal coupled to the resistor R16, a second terminal coupled to a ground node, and a third terminal coupled to a first winding of transformer L2. Zener diode D2 is coupled in parallel with the second and third terminals of transistor Q2, by being coupled with the ground node and the first winding of the transformer L2. The first winding of the transformer L2 is coupled to a power supply (e.g., a ~3 V battery voltage) and the third terminal of the transistor Q2. A second winding of the transformer L2 is coupled to the ground node and an anode of diode D1. A cathode of diode D1 is coupled to node TP1 where the electrode connects. Node TP1 is coupled to a first terminal of transistor Q1, a first terminal of pull down resistor Rpd, and optionally, a capacitor Cextra. The pull down resistor Rpd has a second terminal coupled to a voltage reference, VREF. Node TP1 also includes stray capacitances, which are modeled as a single stray capacitor Cstray to the ground node in FIG. 4. The transistor Q1 has a second terminal coupled to a switched signal for RX_ENABLE, and a third terminal coupled to the inverting input 2 of the amplifier IC1A. The non-inverting input 3 of the amplifier IC is coupled to voltage reference VREF. The output terminal 1 of the amplifier IC1A is coupled to a first terminal of feedback capacitor Cf and feedback resistor Rf, and the non-inverting terminal of the amplifier IC1A is also coupled to a second terminal of the feedback capacitor Cf and feedback resistor Rf.

In FIG. 4, the transmit/receive circuit uses a battery voltage (e.g., approximately 3 V) and generates a high voltage at ~100V (delivering tens of microamps of current at a maximum), and a receiver can be placed on the same node. The receiver may be disconnected, so that it does not affect the generated high voltage during transmission, and the transmitter may be disconnected, so that it does not affect the received signal during reception. The high voltage can be generated using a flyback circuit, similar to the flyback circuit used to excite a cathode ray tube display, or used in a switchmode power supply. The flyback circuit includes the transformer L2, which stores energy. Energy may flow into the first or primary winding of L2, be stored as a magnetic field, within the core of L2, and then flow out of the core of L2, through the secondary winding of L2. The voltage may be transformed according to the turns ratio of the transformer L2, and according to the timings of the applied signals. The energy flowing out through the secondary winding of L2 may flow into the stray capacitance at the output through D1, and develop the high voltage across that stray capacitance. That stray capacitance may be designed to be as small as practical, since the real power dissipated by this circuit, at least $0.5*Cstray*V^2*f$, can be proportional to that capacitance.

When transmitting, the high voltage AC is generated with a flyback transformer L2. To produce an excitation voltage with frequency $f=1/T$, and assuming a switch duty cycle of 50%, the switch Q2 is closed for a time $0.5*T$. During this time, the current in the transformer, starting from zero, ramps up to a primary current of $Ipri=(Vdd*0.5*T)/Lpri$, where Vdd is the supply voltage, typically around 3 V, and Lpri is the primary inductance. When the switch opens, this stored energy is delivered to the stray capacitance Cstray at the output of the flyback circuit. Neglecting the resistor Rpd, the peak voltage may be calculated by equating the energy stored in the transformer inductance, $0.5*Lpri*Ipri^2$, with the energy stored in the output stray capacitance, $0.5*Cstray*Vpk^2$. The voltage can decay exponentially as $Rpd*Cstray$, where that product should be chosen on the same order as the excitation period, so that the output decays roughly back to zero every cycle. In practice, Cstray can be a capacitance in the picofarads, for example, and Rpd can be in the hundreds of kilohms. The transformer primary inductance can be in the hundreds of microhenries, and its turns ratio can be around 1:7. The resistor Rpd may be replaced with a switch to ground (for example, a FET or bipolar transistor). This can produce an approximate square wave, which is closer to the desired ideal sine wave than the repeated exponentials produced with a resistor.

When a high voltage is applied to the electrode, the receiver at IC1A may be protected from destruction by opening the switch Q1 (e.g., a transistor) to isolate the receiver in transmit mode. Otherwise, the receiver circuit IC1A would clamp the high transmit voltage, and possibly be destroyed by it. That circuit is therefore disconnected using the transistor, n-FET Q1. This n-FET can be chosen for a high voltage rating (i.e., a voltage rating greater than the peak voltage seen at the electrode), and for low stray capacitance (which would increase the Cstray, and therefore decrease the acceptable Rpd and increase the total power consumption of the system when transmitting). This transistor Q1 is a discrete FET, and therefore can have its body node connected to its source node, which produces a parasitic diode; but this diode is always reverse-biased, since the voltage at the drain is always greater than the voltage at the source, which can mean that it does not affect the operation of the circuit. When transmitting, the gate voltage of Q1 is held at 0 V, which puts a voltage −VREF (with VREF around 0.5*Vdd) on the gate, which turns the transistor off. When receiving, a voltage Vdd is applied to the gate of Q1. This can put a voltage (Vdd-VREF) on the gate, which turns the transistor on. The signal may therefore flow into the receiving transimpedance amplifier IC1A. As such, in the receiver mode, a high voltage can be placed on the gate of Q1 (e.g., RX_ENABLE pin) so that the transistor Q1 is conducting, and behaves like a short circuit. The stray capacitances, however, due to that transistor and due to the diode D1, cannot be disconnected. To a first order, additional impedances to ground at the inverting input of IC1A would not affect the closed loop transfer function; but for a practical amplifier with finite gain-bandwidth, this may not be the case. The capacitance Cstray does not significantly affect the closed loop transfer function of the receive amplifier. Rpd does not have a significant dynamic effect; it would introduce a significant DC error if connected to ground, but is connected to the same VREF as the opamp's non-inverting input to avoid this issue.

The transformer secondary inductance would introduce a significant error, but when receiving, the voltage at the anode of L2 is held close to ground by the transformer, and the voltage at the cathode is held at VREF>0. This means that the diode is reverse-biased, which means that it isolates the receive circuit from that transformer inductance. The same diode is therefore used as part of the flyback circuit, to allow only unidirectional current from the transformer secondary into the output capacitance, and to isolate the receiver from that flyback circuit, reducing parts count.

In some implementations, there may be a variation in the stray capacitance Cstray of 2:1 or more, which could produce a variation in the peak generated voltage. So circuit designs can be made with a sufficiently high voltage to achieve a desired signal to noise ratio with the highest possible capacitance Cstray, without generating a high enough voltage to cause a transistor to break down, even with the lowest possible Cstray. In some implementations, a deliberate capacitance (e.g., Cextra in FIG. 4) can be added in parallel with the stray capacitance Cstray. If the tolerance on this deliberate capacitance is better than that of the stray capacitance, then this has the effect of decreasing the variation in the peak voltage, but increasing the total capacitance, and therefore increasing total power consumption. In some implementations, instead of using a flyback circuit, another s switchmode power supply topology may be used.

Figure 5:
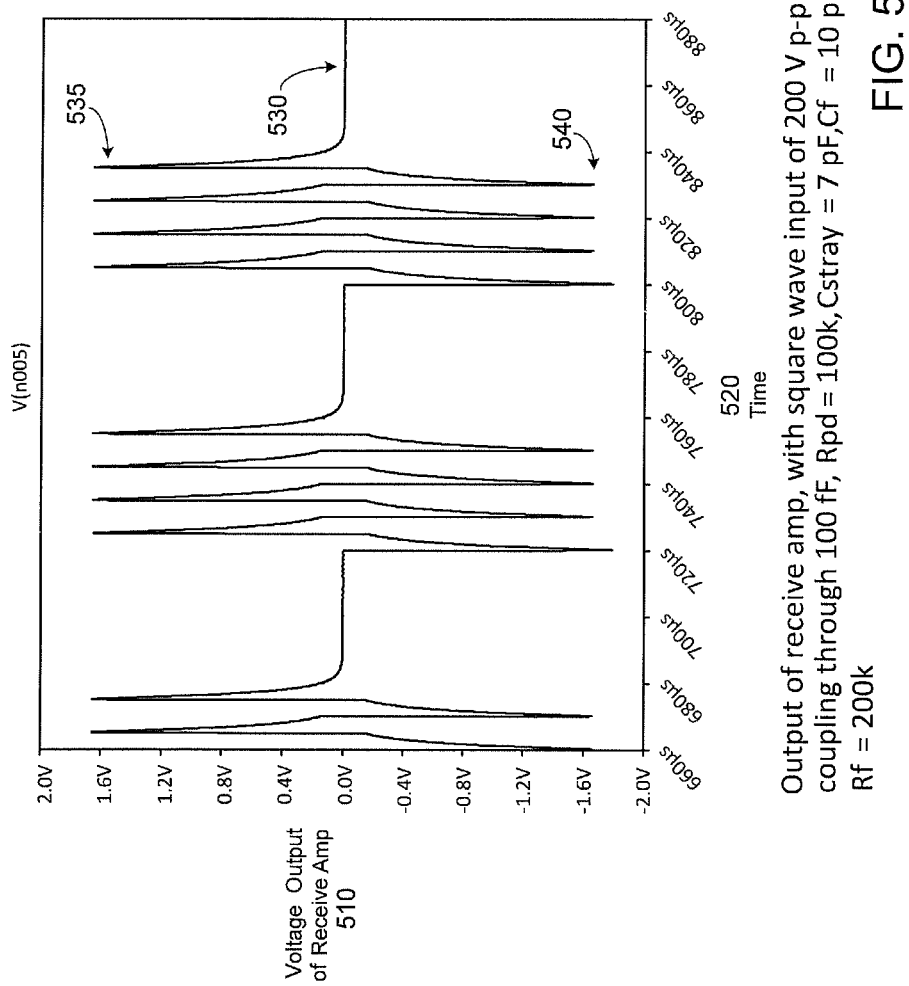
FIG. 5 depicts a diagram with an example of the voltage output of the receiver amplifier versus time.

FIG. 5 shows a diagram with an example of the voltage output of the receiver amplifier 510 versus time 520. The input signal is a square wave input of 200 V peak to peak, coupling to the receiver through a 100 fF capacitance. For this example, Rpd is 100 kOhms, Cstray is 7 pF, Cf is 10 pF and Rf is 200 kOhms. The peak voltage 535 for the output voltage waveform 530 is about 1.6 V, and the lowest voltage 540 for the output voltage waveform 530 is about −1.6 V.

Figure 6:
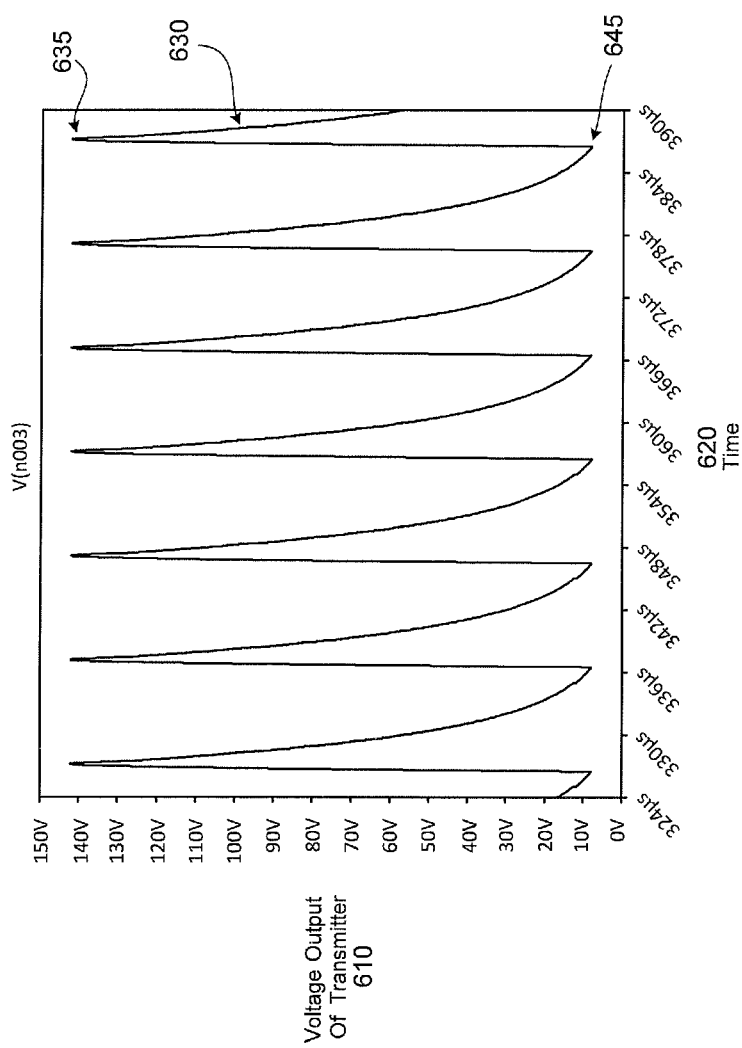
FIG. 6 depicts a diagram with an example of the voltage output of the transmitter versus time.

FIG. 6 shows a diagram with an example of the voltage output of the transmitter 610 versus time 620. The input voltage is 3 V, Cstray is 7 pF, Rpd is 100 kOhms, Lpri (the inductance of the first winding of the transformer L2) is 200 uH, Lsec (the inductance of the second winding of the transformer L2) is 10 mH, and the transformer L2 therefore has turns ratio of approximately 1:7. The highest value 635 of the output voltage waveform 630 is about 140 V, and the lowest voltage 645 is about 10 V.

Some of the described embodiments of the subject matter and the operations can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. The data processing apparatus may include the sensor, may be part of the sensor, may be a part of a system with the sensor, may be integrated within the system and/or sensor, may be part of receivers, transmitters, components and/or logic associated with the sensor or the receivers and/or transmitters, or any combination thereof. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

Various apparatuses, devices, and machines for processing data, may be used as a "data processing apparatus," including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. A human finger, for example, can interact with a touch screen to impact an amount of screen real estate. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be useful.

What is claimed is:

1. A method for use with a two dimensional sensor array, the method comprising:
    in a transmission mode, configuring a device having a circuit and an electrode for transmitting a voltage to a node of the two dimensional sensor array coupled electrostatically to the electrode by:
        generating a voltage using a switchmode power supply circuit, wherein the switchmode power supply circuit comprises at least an inductor and a diode, the diode being coupled to a transformer,
        permitting the diode to be intermittently forward-biased, and permitting current to flow through the diode into a stray capacitance, and
        configuring a switch to electrically isolate a component in the circuit; and
    in a receiving mode, configuring the circuit for receiving the current through the node coupled to the electrode by:
        configuring the switch to receive the current into the electrically isolated component in the circuit, and
        configuring the diode to be reversed-biased such that the component is electrically isolated from an inductance of the transformer in the switchmode power supply circuit; and
    further in the receiving mode, configuring the circuit for determining a position of the electrode with respect to the two dimensional sensor array based on the received current.

2. The method of claim 1, wherein a resistor is coupled to the diode, the method further comprising providing a reference voltage on at least one terminal of the resistor that is greater than a ground voltage of the circuit.

3. The method of claim 1, further comprising, in the receiving mode, sending at least part of the received current into a current receiver circuit, wherein the current receiver circuit is controlled by a microcontroller.

4. The method of claim 1, wherein configuring comprises configuring the switch to open in the transmission mode to electrically isolate the component in the circuit configured for receiving the current in the receiving mode from the voltage formed across a parasitic capacitance associated with one or more components on the node coupled to the electrode.

5. The method of claim 4, further comprising placing a second deliberate capacitance in parallel with the stray capacitance at the node coupled to the electrode.

6. The method of claim 5, further comprising receiving the current on an order of one microamp, and transmitting the voltage on an order of one hundred volts.

7. The method of claim 1, wherein the switchmode power supply circuit comprises a flyback circuit.

8. An apparatus for use with a two dimensional sensor array, the apparatus comprising:
  an electrode;
  components configured for receiving current in a receiving mode;
  a switchmode power supply circuit comprising at least a transformer and a diode, wherein the diode is coupled to the transformer; and
  a switch configured to switch between a receiving mode and a transmission mode;
  wherein
    in the transmission mode, a circuit for transmitting the voltage to the electrode is configured to:
      generate the voltage using the switchmode power supply circuit,
      permit the diode to be intermittently forward-biased, and for current to flow through the diode into a stray capacitance, and
      open the switch to electrically isolate at least some of the components configured for receiving the current in the receiving mode from the voltage formed across the stray capacitance; and
    in the receiving mode, the circuit for receiving the current from the electrode is configured to:
      close the switch to receive the current into the electrically isolated components configured for receiving the current, and
      permit the diode to be reversed-biased in the receiving mode such that at least some of the components configured for receiving the current in the receiving mode are electrically isolated from an inductance of the transformer in the switchmode power supply circuit; and
    further in the receiving mode, the circuit is configured to determine a position of the electrode with respect to the two dimensional sensor array based on the received current.

9. The apparatus of claim 8, wherein the switchmode power supply circuit comprises a flyback circuit.

10. The apparatus of claim 8, further comprising a resistor, wherein the resistor is coupled to the diode, wherein the circuit is configured to provide a reference voltage on at least one terminal of the resistor that is greater than a ground voltage of the circuit.

11. The apparatus of claim 8, wherein the circuit is configured to send, in the receiving mode, at least part of the received current into a current receiver circuit, wherein the current receiver circuit is controlled with a microcontroller.

12. The apparatus of claim 8, wherein the stray capacitance comprises a parasitic capacitance associated with one or more components on a node coupled to the electrode.

13. The apparatus of claim 8, further comprising a second deliberate capacitance that is located in parallel with the stray capacitance at a node coupled to the electrode.

14. The apparatus of claim 8, wherein the received current is on an order of one microamp, and wherein the transmitted voltage is on an order of one hundred volts.

15. A system for use with a two-dimensional sensor array, the system comprising:
  an electrode;
  components configured for receiving current in a receiving mode;
  a switchmode power supply circuit comprising at least a transformer and a diode, wherein the diode is coupled to the transformer; and
  a switch configured to switch between a receiving mode and a transmission mode;
  wherein
    in the transmission mode, a circuit for transmitting the voltage onto the electrode is configured to:
      generate the voltage using the switchmode power supply circuit,
      permit the diode to be intermittently forward-biased, and for current to flow through the diode into a stray capacitance,
      open the switch to electrically isolate at least some of the components configured for receiving the current in the receiving mode from the voltage formed across the stray capacitance; and
    in the receiving mode, the circuit for receiving the current from the electrode is configured to:
      close the switch to receive the current into the components configured for receiving the current in the receiving mode;
      electrically isolate at least some of the components configured for receiving the current in the receiving mode from an inductance of the transformer in the switchmode power supply circuit; and
    further in the receiving mode, the circuit is configured to determine a position of the electrode with respect to the two dimensional sensor array based on the received current.

16. The system of claim 15, wherein the switchmode power supply circuit comprises a flyback circuit.

17. The system of claim 15, further comprising a resistor, wherein the resistor is coupled to the diode, wherein the circuit comprises means for providing a reference voltage on at least one terminal of the resistor that is greater than a ground voltage of the circuit.

18. The system of claim 15, wherein the circuit comprises means for sending, in the receiving mode, at least part of the received current into a current receiver circuit, wherein the current receiver circuit is controlled with a microcontroller.

19. The system of claim 15, wherein the stray capacitance comprises a parasitic capacitance associated with one or more components on a node coupled to the electrode.

20. The system of claim 15, further comprising a second deliberate capacitance that is located in parallel with the stray capacitance at a node coupled to the electrode.

21. The system of claim 15, wherein the received current is on an order of one microamp, and wherein the transmitted voltage is on an order of one hundred volts.

* * * * *